Patented Mar. 12, 1946

2,396,293

UNITED STATES PATENT OFFICE 2,396,293

COMPOSITION OF MATTER

Winthrope C. Smith, Elizabeth, N. J., assignor to Standard Oil Development Company, a corporation of Delaware No Drawing. Application August 22, 1942, Serial No. 455,777

14 Claims. (Cl. 260—28)

The present invention pertains to certain novel compositions of matter.

It is an object of this invention to prepare certain novel compositions of matter which are suitable for use as coating compositions.

It is a further object of this invention to provide the art with certain novel coating compositions capable of yielding tough, flexible, water-proof and non-tacky films.

It is also an object of this invention to provide the art with certain novel combinations of polymeric materials, wax or wax-like materials and volatile solvents which are capable of being cast into films or for coating or impregnating metals, cloth, paper and the like.

It has been found that coating compositions of particularly good properties are obtained by dissolving a copolymer of a styrene and a diolefine, a polymerized isoolefine and a wax or wax-like material in a suitable volatile solvent. The resultant compositions yield tough, flexible, waterproof and non-tacky films. The presence of the waxy material in the composition is particularly important since it produces a surface on the films that is non-tacky and smooth to an extent not obtainable without it. The wax also permits the use of a higher solid content in the solution without experiencing the objectionable large viscosity increase usually obtained with polymer additions.

The copolymers of a styrene and a diolefin which are used in my coating composition are prepared by interpolymerizing about 65 to 95% by weight of an aromatic hydrocarbon of the structural formula:

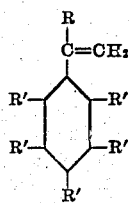

wherein R and R' are selected from the group consisting of hydrogen, and alkyl radicals with 35 to 5% by weight of a diolefin capable of copolymerizing with such aromatic hydrocarbons while dispersed in an aqueous medium in the presence of a polymerization catalyst and at a temperature above about 35° C. Suitable aromatic hydrocarbons of the above type include styrene, alpha methyl styrene, para methyl styrene, alpha methyl para methyl styrene and the like, while the diolefines which may be used include butadiene, isoprene, piperylene, dimethyl butadiene, chloroprene or any other polyolefine or homologue thereof capable of polymerization or copolymerization with the vinyl aromatic compound in emulsion form. The ratio of reactants to water in the preparation of the emulsion polymerizate is about 1/2. Suitable emulsifiers such as sodium oleate and sodium stearate, catalysts such as hydrogen peroxide, sodium perborate and potassium or ammonium persulfates and a modifier such as carbon disulfide are generally used. The polymerization is conducted at temperatures of about 135° F. to 145° F. and for a period of from about 12 to about 22 hours. Upon completion of the polymerization, the latex is stripped of unpolymerized reactants and the latex coagulated with brine or other suitable coagulant, washed and dried. The preparation of such copolymers is described in application Serial No. 408,814, filed August 29, 1941, by Anthony H. Gleason, Per K. Frolich and William J. Sparks, entitled "Modified styrene interpolymers."

The polymerized isoolefins are obtained by polymerizing an isoolefine such as isobutylene in the presence of a metal halide catalyst of the Friedel-Crafts type at temperatures below about —10° C. The preparation of these polymers is well known in the art, and is described in the Mueller-Cunradi et al. U. S. Patent 2,203,873. The polymerized isoolefins that may be used in accordance with my invention have a molecular weight between about 60,000 and 200,000. Those having a molecular weight between 90,000 and 125,000 are preferred.

The wax or waxy materials that may be used in accordance with the present invention include paraffin wax having a melting point of 125–145° F., high melting amorphous waxes such as Superba, ceresin and esters such as monostearin and glycol tri-stearate.

The volatile solvents which may be used in the composition of the present invention include aromatics such as benzene, toluene and the like and chlorinated aliphatics such as ethylene-dichloride, carbon tetrachloride and mixtures of the above with di-isobutylene.

The proportion in which the components of my composition may be used may be varied. The solid components generally comprise from about 80 to about 95 parts by weight of the styrene-diolefine copolymer, from about 5 to about 20 parts by weight of the polymerized isoolefin and from about 5 to about 10 parts by weight of a wax or wax-like material. As a general rule, the coating composition contains from about 5 to 15% by weight of solid materials and about 85 to about 95% of solvent.

The following examples are illustrative of my invention, but it is to be understood that my invention is not limited thereto. The parts given are by weight.

*Example 1*

90 parts of a styrene-isoprene copolymer, 10 parts of a polyisobutylene having a molecular weight of about 100,000 and 10 parts of paraffin wax are dissolved in 600 parts of carbon tetrachloride. The resultant compositition gives a tough, flexible film when applied to cloth or paper. The film is water-proof and non-tacky.

*Example 2*

80 parts of a styrene-isoprene copolymer, 20 parts of a polyisobutylene having a molecular weight of about 115,000 and 10 parts of paraffin wax are dissolved in a mixture of 400 parts of benzene and 200 parts of di-isobutylene. This composition also gives water-proof, non-tacky films on cloth or paper.

A composition of similar properties is obtainable by substituting 8 parts of ceresin for the paraffin wax.

What I claim and desire to secure by Letters Patent is:

1. A composition of matter comprising from about 80–95 parts by weight of a copolymer of from 65 to 95% by weight of a vinyl aromatic compound selected from the group consisting of styrene, alpha methyl styrene, para methyl styrene and alpha methyl para methyl styrene and from 35 to 5% by weight of a conjugated diolefin, about 5 to 20 parts by weight of a polymerized isoolefin of between about 60,000 and 200,000 molecular weight and about 5 to 10 parts by weight of a wax.

2. A composition of matter comprising from about 80–95 parts by weight of a copolymer of from 65 to 95% by weight of a vinyl aromatic compound selected from the group consisting of styrene, alpha methyl styrene, para methyl styrene and alpha methyl para methyl styrene and from 35 to 5% by weight of a conjugated diolefin, about 5 to 20 parts by weight of polyisobutylene of between about 60,000 and 200,000 molecular weight and about 5 to 10 parts by weight of a wax.

3. A composition of matter comprising from about 80–95 parts by weight of a copolymer of from 65 to 95% by weight of a vinyl aromatic compound selected from the group consisting of styrene, alpha methyl styrene, para methyl styrene and alpha methyl para methyl styrene and from 35 to 5% by weight of isoprene, about 5 to 20 parts by weight of polyisobutylene of between about 60,000 and 200,000 molecular weight and about 5 to 10 parts by weight of a wax.

4. A composition of matter comprising from about 80–95 parts by weight of a copolymer of from 65 to 95% by weight of styrene and from 35 to 5% by weight of isoprene, about 5 to 20 parts by weight of polyisobutylene of between about 60,000 and 200,000 molecular weight and about 5 to 10 parts by weight of a wax.

5. A composition of matter comprising from about 80–95 parts by weight of a copolymer of from 65 to 95% by weight of a vinyl aromatic compound selected from the group consisting of styrene, alpha methyl styrene, para methyl styrene and alpha methyl para methyl styrene and from 35 to 5% by weight of a conjugated diolefin, about 5 to 20 parts by weight of polyisobutylene of between about 60,000 and 200,000 molecuarl weight and about 5 to 10 parts by weight of paraffin wax having a melting point of about 125–145° F.

6. A composition of matter comprising from about 80–95 parts by weight of a copolymer of from 65 to 95% by weight of styrene and from 35 to 5% by weight of isoprene, about 5 to 20 parts by weight of polyisobutylene of between about 60,000 and 200,000 molecular weight and about 5 to 10 parts by weight of paraffin wax having a melting point of about 125–145° F.

7. A composition of matter comprising from about 80–95 parts by weight of a copolymer of from 65 to 95% by weight of styrene and from 35 to 5% by weight of isoprene, about 5 to 20 parts by weight of poylisobutylene of between about 60,000 and 200,000 molecular weight and about 5 to 10 parts by weight of ceresin.

8. A composition of matter comprising from about 80–95 parts by weight of a copolymer of from 65 to 95% by weight of a vinyl aromatic compound selected from the group consisting of styrene, alpha methyl styrene, para methyl styrene and alpha methyl para methyl styrene and from 35 to 5% by weight of a conjugated diolefin, about 5 to 20 parts by weight of a polymerized isoolefin of between about 60,000 and 200,000 molecular weight, about 5 to 10 parts by weight of a wax and a solvent.

9. A composition of matter comprising from about 80–95 parts by weight of a copolymer of from 65 to 95% by weight of a vinyl aromatic compound selected from the group consisting of styrene, alpha methyl styrene, para methyl styrene and alpha methyl para methyl styrene and from 35 to 5% by weight of a conjugated diolefin, about 5 to 20 parts by weight of polyisobutylene of between about 60,000 and 200,000 molecular weight, about 5 to 10 parts by weight of a wax and a solvent.

10. A composition of matter comprising from about 80–95 parts by weight of a copolymer of from 65 to 95% by weight of a vinyl aromatic compound selected from the group consisting of styrene, alpha methyl styrene, para methyl styrene and alpha methyl para methyl styrene and from 35 to 5% by weight of isoprene, about 5 to 20 parts by weight of polyisobutylene of between about 60,000 and 200,000 molecular weight, about 5 to 10 parts by weight of a wax and a solvent.

11. A composition of matter comprising from about 80–95 parts by weight of a copolymer of from 65 to 95% by weight of styrene and from 35 to 5% by weight of isoprene, about 5 to 20 parts by weight of polyisobutylene of between about 60,000 and 200,000 molecular weight, about 5 to 10 parts by weight of a wax and a solvent.

12. A composition of matter comprising from about 80–95 parts by weight of a copolymer of from 65 to 95% by weight of a vinyl aromatic compound selected from the group consisting of styrene, alpha methyl styrene, para methyl styrene and alpha methyl para methyl styrene and from 35 to 5% by weight of a conjugated diolefin, about 5 to 20 parts by weight of polyisobutylene of between about 60,000 and 200,000 molecular weight, about 5 to 10 parts by weight of paraffin wax having a melting point of about 125–145° F. and a solvent.

13. A composition of matter comprising from about 80–95 parts by weight of a copolymer of from 65 to 95% by weight of styrene and from 35 to 5% by weight of isoprene, about 5 to 20 parts by weight of polyisobutylene of between about 60,000 and 200,000 molecular weight, about 5 to 10 parts by weight of paraffin wax having a melting point of about 125–145° F. and a solvent.

14. A composition of matter comprising from about 80–95 parts by weight of a copolymer of from 65 to 95% by weight of styrene and from 35 to 5% by weight of isoprene, about 5 to 20 parts by weight of polyisobutylene of between about 60,000 and 200,000 molecular weight, about 5 to 10 parts by weight of ceresin and a solvent.

WINTHROPE C. SMITH.